Dec. 21, 1965 J. M. CUNNINGHAM 3,224,366

TYPE CARRIER DEVICE

Filed March 28, 1963 5 Sheets-Sheet 1

INVENTOR
JAMES M. CUNNINGHAM
BY John S. Gasper
ATTORNEY

TYPE CARRIER DEVICE

Filed March 28, 1963 5 Sheets-Sheet 2

Dec. 21, 1965 J. M. CUNNINGHAM 3,224,366

TYPE CARRIER DEVICE

Filed March 28, 1963 5 Sheets-Sheet 3

Dec. 21, 1965 J. M. CUNNINGHAM 3,224,366

TYPE CARRIER DEVICE

Filed March 28, 1963 5 Sheets-Sheet 4

Dec. 21, 1965 J. M. CUNNINGHAM 3,224,366

TYPE CARRIER DEVICE

Filed March 28, 1963 5 Sheets-Sheet 5

United States Patent Office 3,224,366

Patented Dec. 21, 1965

3,224,366

TYPE CARRIER DEVICE

James M. Cunningham, Endwell, N.Y., assignor to International Business Machines Corporation, New York, N.Y., a corporation of New York Filed Mar. 28, 1963, Ser. No. 268,757

10 Claims. (Cl. 101—93)

This invention relates to printing and more particularly to a type mechanism for a high speed printer apparatus.

One form of high speed printer apparatus involves plural type elements cyclically movable in a continuous path. Plural print hammers arranged at uniformly spaced print positions along the path drive an interpositioned print medium against various type faces formed on the type elements. The striking of the print medium against the type elements by the print hammers occurs under the control of a storage device which indicates which characters are to be printed at the various hammer print positions and a coacting type tracking means which identifies the various characters as they approach the various print positions along the path. When a complete set of characters has moved past every hammer position, a complete line of data will have been recorded on the print medium. The print medium is then advanced to a new line position, a new line of data is placed in storage and the process repeated without stopping the movement of the type elements.

A type mechanism useful in such a printer apparatus comprises a plurality of type slugs each of which is formed to have one or more engraved type characters thereon. The type slugs are individually detachably secured to a continuous carrier such as a flexible steel band or the like. One or more sets of type slugs, with the type characters thereof arranged in a predetermined sequence are attached to the flexible carrier to form what is commonly called a type chain. The type chain is in turn mounted to a drive mechanism whereby the slugs with carrier are continuously moved along a closed path at least a part of which is straight. In the preferred form, the type chain and drive elements are part of an assembly which is mountable as a self-contained unit in a printer apparatus as part of a print mechanism.

While the type chain mechanism is well suited for high speed printer apparatus use, it exhibited severe drawbacks when it was desired to increase print apparatus output. The drawbacks stem from the inability of the type carrier to withstand the increased tension loads imposed by increasing the printer speed operation. In addition, the inherent flexibility of the type chain to a variable degree contributes to errors in spacing and positioning of the type under higher repetitive impacts from multiple print hammers. In other words, an increased hammer striking rate which accompanies increased printer operating speeds imposes greater tension forces on the chain which affects longitudinal displacements of type slugs from their regular positions along the chain. The result of such displacement is to lessen the precision in the coincidence of strike and location of the type slug to thereby deleteriously affect print quality. In addition, the increased tension loads brought about from higher striking rates tends to rupture the type chain much more rapidly so that additional maintenance and printer interruption are required.

It is therefore a general object of this invention to provide an improved type mechanism for a high speed printer.

It is a more specific general object of this invention to provide an improved type mechanism for a high speed printer which overcomes the above disadvantages of the type chain type mechanism, and which at the same time retains all the above-mentioned advantages thereof along with higher speed operating capabilities, long life, ease of maintenance, and precision in location of the type as they move along the print line.

It is a specific object of the present invention to provide an improved type mechanism which is a self-contained unit or cartridge, which achieves the above object and which is interchangeable within a printer apparatus.

It is a further object of the present invention to provide a type mechanism which attains the above objects and provides for additional improvement in the replacement of individual type elements within the type mechanism.

It is a further specific object to provide an improved type mechanism having plural type elements movable within a continuous path and in which individual type elements are replaceable without disassembling a large portion of the type cartridge unit.

In accordance with the practice of this invention, the above, as well as other, objects and advantages are attained by providing a type mechanism in which plural type elements are moved as a type train along a stationary guide member. The guide member preferably takes the form of a monorail attached to a stationary support plate having parallel spaced apart straight portions connected at opposite ends by curved portions coacting with the straight portions to form a continuous closed guide path for the type elements. The type train is formed by assembling enough type elements along the course of the guide member so that they move through an abutting relation particularly in the straight portions of the track. The type elements comprise a base portion slidable on the monorail. In the preferred embodiment, the monorail is rectangular in cross section. Guide means formed on the base portion of the type elements slidably grip the external and internal vertical guide surfaces of the monorail during longitudinal motion along the straight portion of the monorail where striking by a hammer means is effected. Type characters are formed on the surface of the external guide means so that impact by the hammers occurs on a line which passes through the monorail. By locating the type characters on the external guide means in line with the monorail, a more rigid support for the type elements is obtained during printing. With the increased rigidity impact duration is reduced and faster rebounding of the type hammers may be obtained. Extending upwardly from the base portion is a drive arm having gear teeth on the interior surface for drivingly engaging gear means located within the curved portions of the monorail.

In the preferred embodiment, the type support has a stabilizer rail which is parallel to the monorail in the straight portion where striking occurs. The base portion preferably has a horizontal section which rides simultaneously on coplanar horizontal surfaces of the monorail and stabilizer rail.

A retainer plate is mounted on the base plate so as to overlay the base portions of the type elements and maintains the base portions in sliding contact with the horizontal surfaces of the monorail and stabilizer rail.

A cover plate which rotatably carries a drive gear at spaced apart locations corresponding with the inner side of the curved portions of the monorail, is superimposed on the retainer plate. When the cover plate is so mounted, the gear wheels are coplanar with the retainer plate and overlay the base portions of the type elements in the curved portions of the track. In such manner vertical alignment is obtained with the retainer plate and gear wheels coacting to retain the type elements in horizontal contact with the monorail throughout its length.

In accordance with this invention, the type elements move as a train. In such an arrangement the type elements are interconnected by abutment only. In the preferred form of the type elements, the abutment occurs along edges of the base portion of the type element above the guide extension and preferably along the edges of the drive arm. A shield member attached to the retainer plate operates to prevent the print medium from contacting the type elements near the abutting edges of the drive arms. In a second embodiment of the invention the shield member engages an outer surface of the drive arm of the type elements as they move in the impact region to further stabilize the type elements under impact from print hammers.

A further feature of the invention provides for means for removing foreign particles which are likely to lodge between the abutting surfaces of the type elements and the coacting surfaces of monorail type elements and gear wheels. Such particle remover preferably comprises groove means formed in the monorail, the edges of which wipe the surface of the type element sliding along the monorail. In the preferred form, the groove is formed at an oblique angle to the direction of travel of the type elements. A transverse wiping edge is formed in the horizontal surface of the monorail and an oblique edge in the vertical guide surface which is in contact with the outer guide means of the type elements. With an oblique groove edge, the collected lint particles are collected and moved to an external terminus of the groove where the collected particles are discharged. The cleaning groove is preferably located in the monorail at the juncture of the curved and straight portion in advance of the striking region. Further advantage is obtained by providing at least one additional groove means in the monorail where the type elements are wiped after passing from the striking region.

Thus it will be appreciated that a type carrier is provided in which a self-cleaning operation is afforded whereby more precise spacing of characters is obtained. Longer operation is obtained since the moving parts do not become bound. In addition, a type mechanism having improved wear characters coupled with more precise spacing of type for use in a back printer operating at high speed has been provided.

The foregoing and other objects, features and advantages of the invention will be apparent from the following more particular description of preferred embodiments of the invention, as illustrated in the accompanying drawings.

Figure 1:
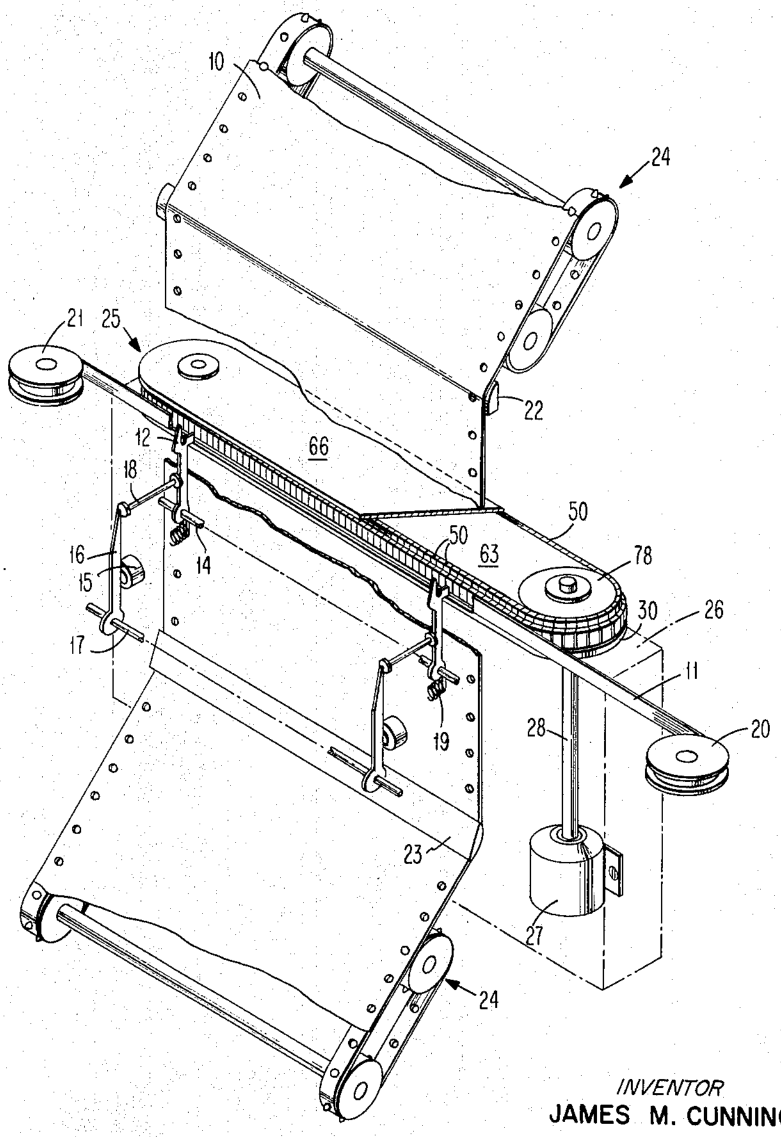
FIG. 1 is a schematic showing of a printer apparatus incorporating the type mechanism of the present invention.

Referring to the drawings:

FIG. 1 shows a schematic version of a high speed printer having a print mechanism in which a print medium such as a paper document 10 and an ink ribbon 11 are moved by a plurality of print hammers 12 located at various print positions along a straight line to strike against various type characters formed on the faces of a plurality of type elements 50 movable at constant speed in a continuous path in a direction transverse to the direction of feeding of paper document 10. The print hammers 12 may be pivotally mounted on a horizontal support rod 14. Operating means for the hammers 12 may take various form but preferably include an electromagnet 15, armatures 16 pivotally mounted on a support rod 17 and an interconnecting movable push rod 18. Springs 19 bias the hammers 12, push rods 18, armature 16 to a retracted position when electromagnet 15 is deenergized. When the electromagnet is energized, armature 16 is attracted thereto so as to pivot on rod 17. The armature 16, when pivoting, drives the push rod 18 and hammer 12 forward against the bias of spring 19. In the preferred form, the stroke of the armature 16 is limited by the core of electromagnet 15 so that push rod 18 and hammer 12 move under their own inertia to strike the print medium 10 and 11 against the type elements 50. Further details of construction and operation of the hammer mechanism may be appreciated by reference to my copending application for a Print Hammer Mechanism and Assembly filed on even date herewith and assigned to a common assignee.

The ink ribbon 11 is fed between a pair of rotatable spools 20 and 21 in any well known manner. The paper document 10 is fed upwardly over upper and lower guide bars 22 and 23, respectively, by forms feed tractors 24, or the like. The tractors 24 are connected to drive means, not shown, whereby document 10 is fed in a step-like manner under control of means well known in the art for advancing the paper document 10 each time a complete line of data is printed on document 10.

In accordance with this invention, the type mechanism takes the form of a self-contained unit or cartridge which includes individual type elements mounted on a supporting and housing members in the form of a continuous type train. Each type element 50 has one or more different characters formed thereon. The type elements are assembled so that the various characters are arranged in a predetermined sequence. A complete type train as assembled in the cartridge may include plural sets of the various type characters in which the sequence is repeated as the type elements move along the continuous path. The type cartridge generally referred to by numeral 25 is preferably mounted on a stationary frame 26 which also supports a drive motor 27 which is connected by shaft 28 through a gear train, not shown, to drive means to be described hereinafter in the cartridge 25.

In the preferred embodiment of this invention, the cartridge 25 is removable as a unit from the printer of the type shown in FIG. 1. Such removal is made to perform various operations such as replacement of a complete type train, the replacement of individual type elements and the performance of various maintenance operations not possible while the cartridge 25 is in position on frame 26.

Figure 2:
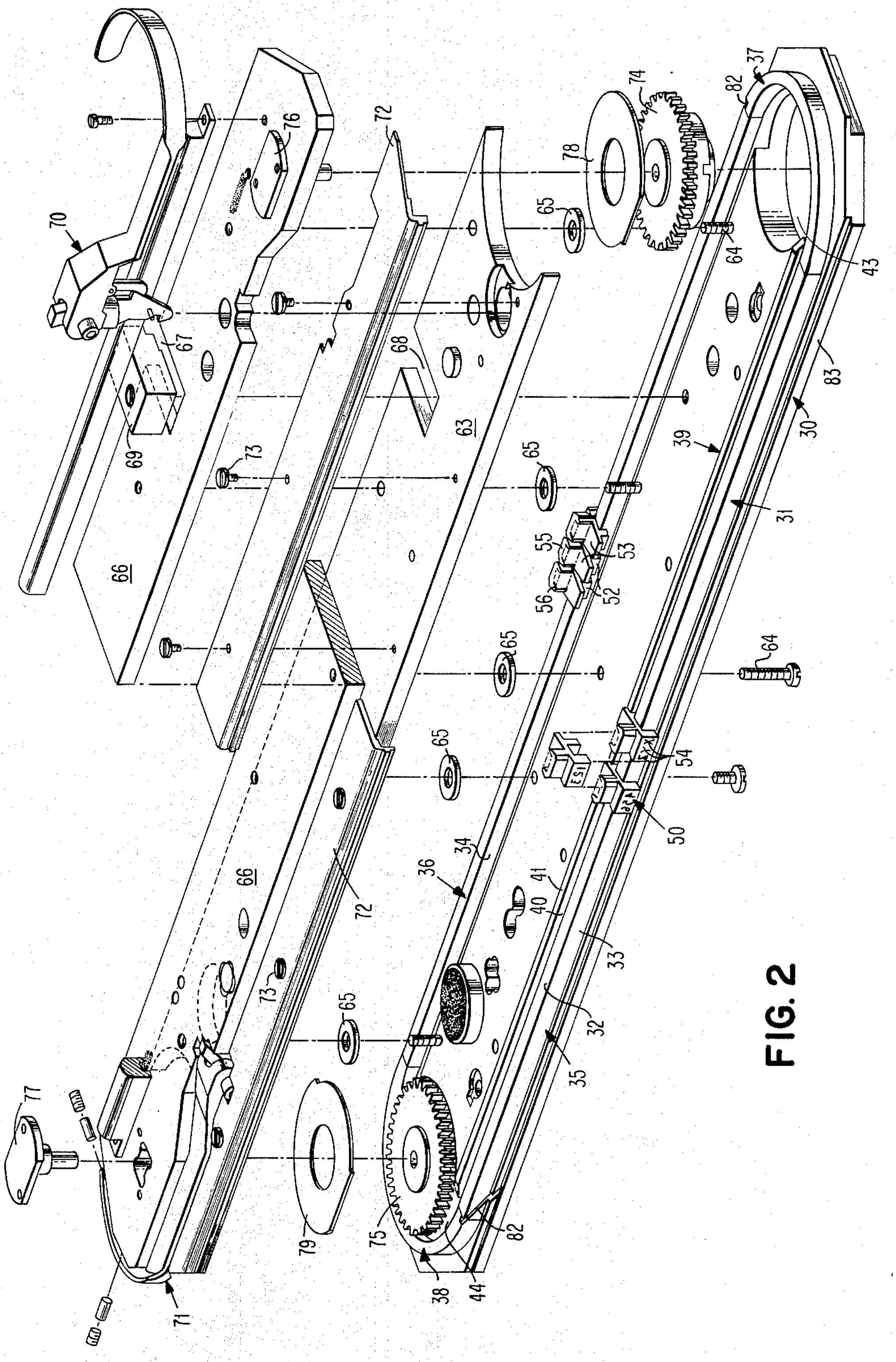
FIG. 2 is an exploded isometric of a type mechanism cartridge assembly incorporating the features of the present invention in accordance with a first embodiment.
Figure 3:
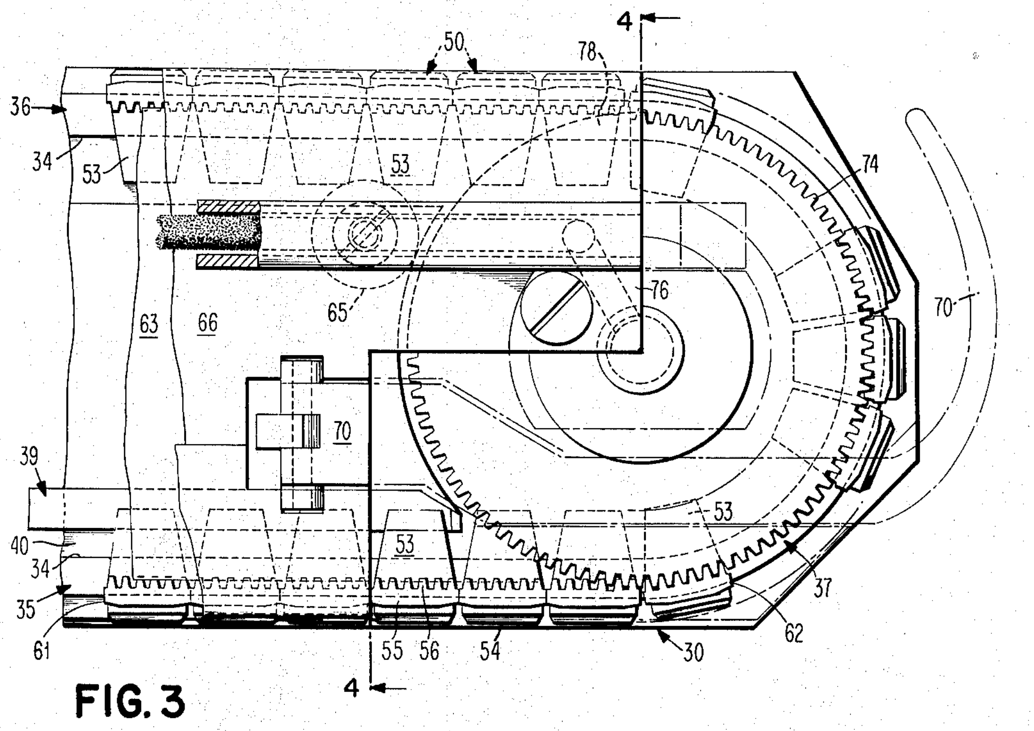
FIG. 3 is a plan view of a fragment of the type mechanism cartridge assembly shown in FIG. 2 with parts cut away.
Figure 4:
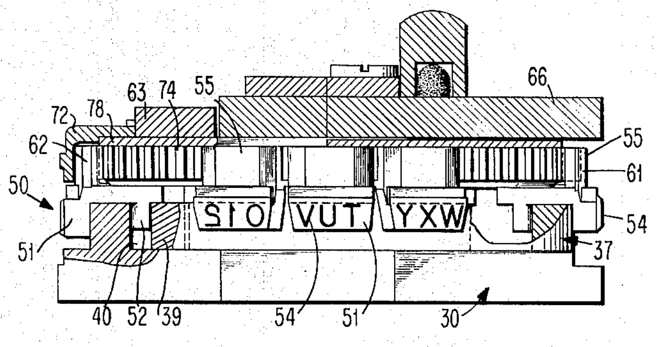
FIG. 4 is a partial section of the assembly of FIG. 2 taken generally along the line 4—4 in FIG. 3.

Referring to FIG. 2, further details of a preferred embodiment of a type cartridge 25 are shown whereby a complete type train and associated drive mechanism are assembled with housing means to form a self-contained unit. The cartridge 25 comprises a horizontal base plate 30 on which is mounted a plurality of individual type elements 50 which form the type train. While only a few type elements 50 are shown on the type cartridge in FIG. 2, it is understood that there are enough type elements to fill a closed path. For guiding the type elements 50 in a closed path, a raised monorail 31 is provided on the upper surface of base plate 30. The monorail 31, which is preferably made integral with the base plate 30 by suitable machining operation, is preferably rectangular is cross section so as to provide an upper horizontal and adjoining vertical front and rear guide surfaces 32, 33 and 34, respectively. In the preferred embodiment for a high speed printer, the type elements 50 are moved in a straight line transverse to the paper document 10 of FIG. 1 in order that the feeding of the paper may be facilitated. For that purpose, the monorail 31 is formed on base plate 30 with front and rear straight sections 35 and 36, respectively with connecting left and right end curve portions 37 and 38. For use in the printer embodiment of FIG. 1, these straight portions 35 and 36 of monorail 31 are at least coextensive with the length of the print line to be printed on paper 10. However, they are preferably slightly longer than the print line to permit each type element 50 to move beyond the end of the print line before it begins its swing around one of the curved portions 37 or 38.

Also formed on base plate 30 inside and parallel with the straight portion 35 of monorail 31 in the preferred embodiment is a stabilizer rail 39 separated from the monorail 31 by a groove 40. Stabilizer rail 39, which is substantially coextensive with the straight portion 35 of monorail 31, has an upper horizontal guide surface 41 coplanar with the horizontal surface 32 of monorail 31. Inside the curved portions 37 and 38 of monorail 31 the base plate is provided with circular openings or wells 43 and 44.

Figure 8:
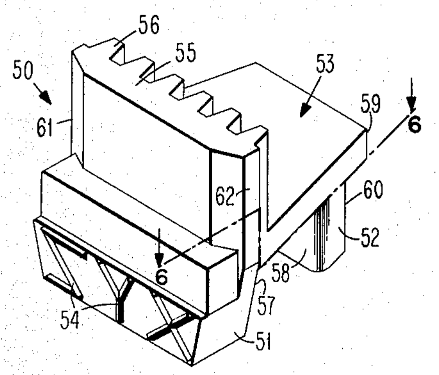
FIG. 8 is a perspective view of the type element used in the type mechanism embodiment of FIGS. 2–7.

In connection with FIG. 1, a plurality of individual type elements 50 are movably mounted on the base plate 30 whereon they may be repeatedly circulated as a train of type. In the preferred form the type elements 50 are adapted to be slidable on monorail 31. For that purpose the type elements 50 are made with a base portion having a longitudinal channel adapted for accommodating the rectangular monorail. As best seen in FIG. 8, the base portion comprises a horizontal portion 53 from which depend vertical guide extensions 51 and 52 spaced to form a channel to receive monorail 31. The external surface of the vertical extension 51 is provided with one or more raised type characters 54 adapted to be struck by hammers 12 to form character imprints on a paper document 10. While the number of type characters may vary, a suitable arrangement would be to have three different characters on each type element as shown in FIGS. 2 and 8. A 48 character alphabet would be obtained by assembling sixteen type elements 50 in juxtaposed position. The arrangement of the type on the individual type elements 50 may vary and it conceivably would vary according to a binary code adapted for print control purposes. In accordance with the present invention, the type elements 50, when assembled, form a type train in which type elements are maintained in continuous abutment throughout the front and rear straight portions of the monorail. To obtain a continuous circulation of the type elements 50 along the monorail 31, there are enough type elements to completely fill it so that a drive force applied to type elements at one end of the front straight portion 35 causes type elements to be moved completely along the monorail 31.

Extending upwardly from the base portion of each type element 50 is a vertical drive arm 55. The drive arm 55 is preferably connected to the base portion near the front end of the horizontal portion 53 and the interior vertical surface of drive arm 55 is provided with gear teeth 56 forming a traveling gear rack whereby a driving connection may be made with suitable gears for moving the type elements 50 along monorail 31. When mounted on monorail 31, the underside of horizontal portion 53 seats on the horizontal surface 32 of monorail 31 while the inner surface 57 of extension 51 bears against external surface 33 of monorail 31 and the inner surface 58 of extension 52 bears against the inner surface 34 of monorail 31. Bearing surface 57 of extension 51 is substantially totally flat whereas the bearing surface 58 of extension 52 is slightly rounded on the edges to permit the type elements 50 to move from the straight portion along the curved portion without binding (see FIG. 6). The horizontal section 53 of the type element in the embodiment of FIG. 8 provides a rear extension 59 having an under surface for engaging the upper surface 41 of stabilizer rail 39.

As previously mentioned, the type elements 59 are moved along monorail 31 by driving the type elements while they are inter-abutting. In the preferred form the abutment of the type elements 50 occurs along the edges of the type elements which are relatively remote from the type characters 54. For that reason, the drive arm 55 of type elements 50 is provided with leading edges 61 and trailing edges 62. It is noted that the edges 61 and 62 are above the region where type characters 54 are formed. Abutment is prevented between the edges of the guide extensions 51 below edges 61 and 62 by tapering or cutting back the edges to provide spaces thereby exposing the outer vertical guide surface 33 of monorail 31. As the type elements 50 move along the front straight portion 35 of monorail 31, they are subjected to repeated hammer strokes. It is important during such operation that the type elements maintain a fixed vertical and horizontal alignment. In accordance with the present invention, transverse longitudinal alignment is attained by having the inner bearing surfaces 57 and 58 of the extensions 51 and 52 in contact with the external and internal guide surfaces 33 and 34 of monorail 31. Horizontal alignment of the type characters 54 is obtained by maintaining the under surfaces of horizontal section 53 and extension 59 in continuous contact with the coplanar upper surfaces 32 and 41 of the monorails 31 and stabilizer rail 39. Furthermore, since striking of the type characters 54 may occur at different points along the front surface of extension 51 the type elements 50 may tend to experience a turning moment in the plane horizontal to the monorail 31. However, this is prevented by providing that the bearing surface 57 of extensions 51 is substantially flat.

The retention of the horizontal guide surfaces of horizontal section 53 and horizontal extension 59 of the type elements 50 is obtained by providing a retainer plate 63 which is mounted on base plate 30 by suitable means such as studs 64. The retainer plate is designed so that it is sufficiently wide when placed on base plate 30 to extend between the straight portions 35 and 36 of the monorail so that the under surface along the parallel straight edges of plate 63 overlays the upper surface of the horizontal sections 53 of the type elements 50. The ends of the retainer plate 63 are cut out in a circular manner corresponding to the contour of the wells 43 and 44 of the base plate 30. The spacers 65 may be provided to assure that the retainer plate 63 is mounted at the proper level above the base plate 30 so that it is in contact with the upper surfaces of section 54 of the type elements so that an ease of movement may be obtained in driving the type elements 50 along the monorail 31. Superimposed on the retainer plate is a cover plate 66 which is shown in two sections in the exploded view of FIG. 2 in order to expose some of the details of the retainer plate 63. A cut out 67 is provided in the rear edge of the cover plate 66 which is in alignment with a similar cut out 68 in the retainer plate 63. A cover element 69 is provided for cut out 68 of retainer plate 63 of a size which fits into cut out 67. Type elements 50 are easily removed through cut outs 67 and 68 from the monorail 31 when cover 69 is removed from plate 63. A pair of latch members 70 and 71 are mounted in a suitable manner to the cover plate 66 and these latch elements afford the necessary means for attaching the cartridge assembly to a frame member, such as described in connection with FIG. 1. A ribbon guide plate and type element shield 72 is provided on the front portion of the cover plate and is mounted by suitable means such as screws 73 to the retainer plate. The shield element is curved so that the front portion thereof is bent over and covers the drive arms 55 of the individual type slugs 50. The type element shield 72 preferably is formed as two individually removable pieces.

The type elements 50 are moved along the monorail 31 by a pair of flat gear wheels 74 and 75 which are located in the recesses 43 and 44 of the base plate 30. Compactness is achieved by having the gear wheels coplanar with retainer plate 63 at opposite ends thereof. The gear members 74 and 75 are suspended by suitable journal members 76 and 77 from the cover plate 66. Dirt shields 78 and 79 are provided on the upper surface of the gears 74 and 75 to prevent lint, etc., from getting into the gear teeth.

In accordance with this invention, the gears 74 and 75 when suspended from the cover plate 66 and when the cover plate 66 is superimposed on the retainer plate 63 and mounted therewith, are in coplanar horizontal alignment with the retainer plate 63 and they overlay the upper surfaces of the horizontal section 53 of the base portion of the type elements 50; and, in addition to performing a driving operation, the gear members also retain, when superimposed in this manner, the type elements 50 in horizontal contact with the upper surface 32 of the monorail 31 as the type elements 50 move over the left and right curved sections 37 and 38 respectively.

The action of the gear elements, the monorail and the type elements as the type elements are moved in longitudinal sliding fashion over the monorail 31 is substantially as follows. The number of type elements 50 mounted on the monorail 31 is sufficient to completely fill the monorail. The type elements in the curved portions 37 and 38 have their gear means 56 engaged by the gear teeth on the respective gear wheels 74 and 75. While both of the gear wheels 74 and 75 may perform a driving operation, in the preferred embodiment, gear wheel 74 is a driving gear while gear wheel 75 is an idler gear. However, this arrangement may be reversed so that the opposite gears are driving and reverse gears. Driving gear 74 rotating counterclockwise therefore will cause type elements 50 engaged by it to move around the curved portion 37 and come into abutment with type elements moving along the straightaway 36. As the first type element 50 on the straightaway is advanced by counterclockwise rotation of the gear wheel 74 it pushes the preceding type elements 50 along the straightaway 36 in a sliding manner whereby the various bearing surfaces of the type elements 50 slide in contact with the monorail. At the same time, the gear wheel 74 on the diametrically opposed portion thereof is taking a type element 50 from the straightaway portion 35 of the forward section of the monorail 31 and is moving it along the curved portion 37. At the left end of the rear section of the monorail a type element 50 comes into engagement with an idler gear 75 also rotating counterclockwise which causes it to move away from the trailing type element and to move along the curved sections 38. The idler gear 75 in rotating counterclockwise moves a forward type element from curved portion 38 onto the straight section 35 into abutment with the type elements 50 thereby the continuous interaction between the drive gear 74, the idler gear 75 and the type elements 50 assures that the type elements 50 along the straight portion 35 and the rear straight portion 36 of monorail are in continuous abutment, this abutment being essential to maintain the spacing between the type characters 54.

Figure 6:
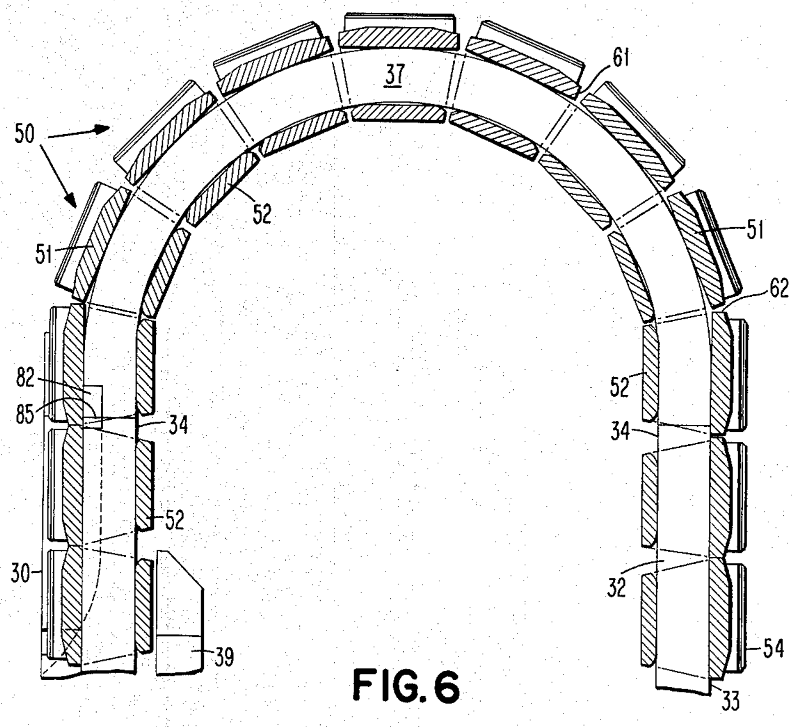
FIG. 6 is a schematic view of the type track of the cartridge mechanism of FIGS. 2–5 with the type elements in cross section along line 6—6 of FIG. 8 to illustrate the mechanical coaction between type elements and track over a portion thereof.

The specific details of the interaction of the various surfaces of the type elements as they move along the straight portions 35 and 36 and curved portions 37 and 38 of monorail 31 are shown in FIG. 6. As seen there the type elements 50 on the straightaway are in abutment along surfaces 61 and 62 of the drive arms 55 of the type elements 50. When the type elements move along curved portions 37 and 38 it will be seen that the type edges 61–62 are no longer in abutment and the guidance of the type elements over the curved portions 57 and 58 depends primarily on the gear wheels 74 and 75. However, when the gear wheels 74 and 75 bring the type elements 50 completely around the curved portions 37 and 38 a reabutment of the edges 61 and 62 is accomplished.

Figure 9:
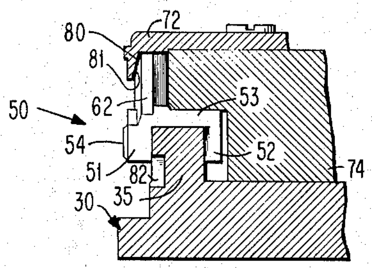
FIG. 9 is a fragment shown in cross section of a second embodiment of a type mechanism according to the present invention.
Figure 10:
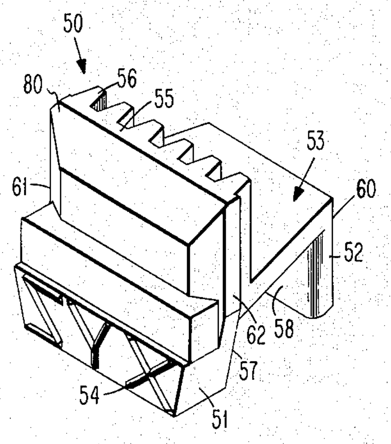
FIG. 10 is a perspective of a second embodiment of a type element used in the type mechanism embodiment of FIG. 9.

In a second embodiment a guide surface 80 is provided on the outer face near the upper end of the drive arm 55 of the type elements 50. A corresponding inner guide surface 81 is formed on the overhanging portion of the ribbon guide 72. The interaction of surfaces 80 and 81 as the type moves on monorail 31 over the straight section 35 thereof affords a means to stabilize the type elements 50 as they are being struck to oppose horizontal turning. In the embodiment of FIG. 9 this function is provided by the stabilizer rail 39 on base plate 30.

In connection with the subject invention, it will be appreciated that, as previously mentioned, the precision of the printing depends on a precise maintenance of the spacing between characters. In has been found in conspacing between characters. It has been found in connection with the type train embodiment of the subject invention that foreign particles such as lint from the ink ribbon and paper documents tend to accumulate on the type characters. These foreign particles over a period of time have a tendency to work into the inner engaging surfaces 61 and 62 of the type elements 50 and in the monorail 31 and the gear wheels 74 and 75. Ultimately, such fouling prevents the type elements 50 from moving smoothly in their closed path and causes binding of the gear wheels 74 and 75; and, in fact, produces a variation in the spacing between the individual type elements 50 which disturbs the spacing between the type characters 54 on adjacent type elements 50. When such variations occur, of course, the striking of the type characters 54 may occur either too early or too late in a printer of the type shown in FIG. 1, thereby causing incomplete character formation or character displacement in a line of type relative to adjacent characters.

Figure 5:
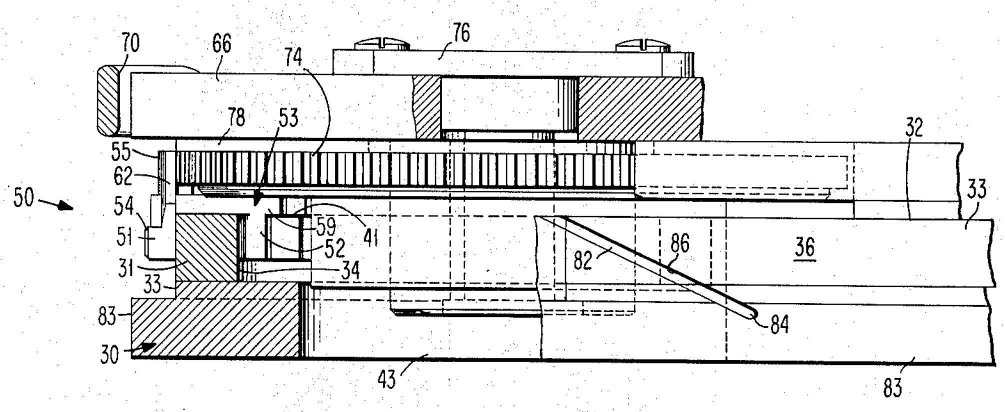
FIG. 5 is a rear elevation of the fragment of FIG. 3 with portions of the type housing cross-sectioned and with some of the type elements removed to more clearly illustrate details of type track construction.
Figure 7:
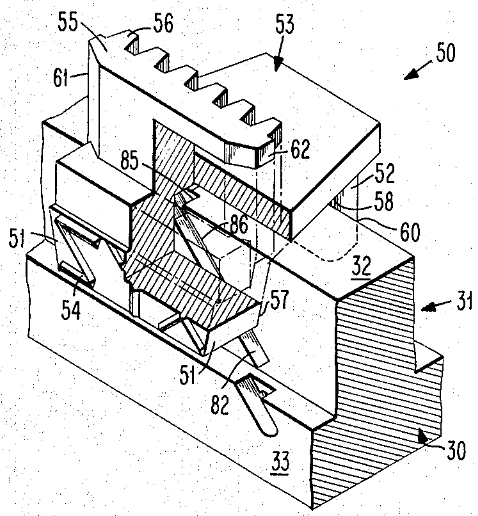
FIG. 7 is a perspective of a portion of the type mechanism of FIGS. 2–6 with parts cut away to illustrate the means for cleaning type elements.

To overcome this defect and in accordance with the practice of this invention, means is provided for removing foreign particles such as lint or the like before it can disturb the relationship between the type elements and the monorail. In the preferred embodiment, the lint removal means comprises a groove 82 formed in the upper surface 32 and front vertical guide surface 33 of monorail 31. As seen more clearly in FIGS. 5, 6 and 7, the groove 82 may lead to the base of the monorail 31 below the type elements onto a ledge 83 formed in the forward end of the base plate 30. A second groove 84 extending from the ledge 83 downwardly may be provided to provide egress for the lint collected by the groove 82 in monorail 31. Examining the figures more closely, it will be seen that the cleaning groove 82 is designed so that it has a transverse wiping edge 85 formed in the upper surface 32 of monorail 31 so that the undersurface of the base portion 53 of the type element 50 is wiped thereon. Simultaneously, the groove 82 is provided with a wiping edge 86 on the front surface 33 of monorail 31 so that the particles collecting on the bearing surface 57 of front extension 51 are removed as the bearing surface 57 wipes the front surface 32 of monorail 31. The wiping edge 86 preferably extends obliquely downward so that the type element 50 in moving in the direction of slant of the wiping edge 86 produces a downward feeding of lint collected in the groove 82. As previously mentioned, the type elements 50 are cut back in the region of the type characters 54 so that the type elements do not abut at proximate to region of contact with the print medium. The advantage in such an arrangement is that when an ink ribbon strikes the type characters 54, any lint particles which may be moved laterally from the characters toward the leading or trailing edges 61 and 62 of the type elements 50 will be free to move transversely toward the monorail front surface 33. Occasionally, when a ribbon is well worn, the striking of the ribbon against the type characters 54 causes particles to fly between the type elements 50 onto the monorail surface. As the bearing surface 57 of extension 51 moves along the front vertical surface 32 of monorail 31, the lint particles are picked up and carried by the extension 51 until such time as the bearing surface 57 is wiped against the cleaning edge 86 of the groove 82. In the preferred form of the invention the cleaning means is provided at plural positions. As shown more clearly in FIG. 2, the groove 82 is provided beginning at the juncture of the curved and straight portions 38 and 35 on the left end of the monorail 31 and similarly beginning at the juncture of the curved portion 37 and the straight portion 36 of the monorail 31 on the right rear portion thereof. The advantage of such an arrangement is that the type elements 50 are beginning their approach as they move along curved section 38 to that region where striking is due to occur. Particles previously collected on the type elements 50 may be wiped before they move into that region thereby reducing the possibility of excessive accumulation in the striking region before cleaning can occur. As the type elements move out of the straight section 35 into the curved portion 37, they are again subjected to a cleaning operation, which takes at least a portion of the contaminating particles before they come all the way around to the end of the curved portion 38 and are again subjected to a second cleaning operation before entering the impact area. The advantage in locating the grooves 82 at the juncture of the straight or curved portions is that the type elements 50 are separated at the time they moved around the curved portion due to the difference in the circular radius of the drive gear and the curved portions 37 and 38. While separated, the type element motion may have loosened some of the particles accumulated thereon or they may not yet have been firmly compressed by the abutting action. Therefore, at the point where the wiping action begins, the abutment is beginning to take place but has not yet become thoroughly firm.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a printer apparatus in which hammer means strikes a print medium against moving type, a type mechanism comprising in combination, (a) type support means,
(b) a continuous monorail on said support means forming a longitudinal guide path,
(c) a type train carried by said support means comprising a plurality of individual type elements slidable on said monorail and in abutment with each other during longitudinal motion along said guide path,
(d) means for moving said type train longitudinally along said monorail,
(e) and means for removing foreign particles collecting on said type elements form interacting surfaces of said monorail and said type elements comprising
(f) groove means in said monorail having wiping edges for contacting surfaces of said type elements slidable on said monorail.

2. In a printer apparatus in accordance with claim 1 in which said particle removing means comprises (a) groove means spaced at plural locations along said monorail whereby said type elements are subjected to particle removal action a plurality of times for each complete cycle of movement along said guide path.

3. In a printer apparatus in accordance with claim 1

(a) said monorail having a straight portion substantially coextensive with a region along which said print medium is struck against said type elements and said groove means is located at one end of said straight portion whereby said type elements are subjected to a cleaning action at the begining of their movement through said striking region.

4. In a printer apparatus in accordance with claim 1

(a) said monorail comprising a straight portion leading from a curved portion and said moving means effectuates a separation of said type elements during motion along said curved portion and a reabutment of said type elements when moving the same along said straight portion,
(b) a raised monorail on the upper surface of said gion along which said print medium strikes said type elements, and said particle removing means includes grooves means having wiping edges in the region of the connection of said curved and linear portions whereby particle removal action occurs substantially coincidentally with the reabutment of type elements and at the beginning of movement through said striking region.

5. In a high speed on the fly back printer a type mechanism assembly comprising in combination (a) a horizontal support plate,
(b) a raised monorail on the upper surface of said support plate,
(c) said monorail having parallel straight and interconnecting curved portions forming a continuous guide path along said support plate,
(d) a plurality of individual type elements forming a continuous type train along said guide path,
(e) said type elements being in abutment along the straight portions of said guide path and individually separated along the curved portions of said guide path,
(f) said type elements having a base portion slidable on said monorail, extensions on said base portions for engaging lateral surfaces of said monorail during longitudinal movement therealong,
(g) type characters formed on said base portion on a surface external to said guide path,
(h) said type elements having a vertical drive arm extending above said base portion,
(i) gear means formed on the interior side of said drive arm,
(j) a horizontal retainer plate on said support plate between the straight portions of said monorail,
(k) said retainer plate having parallel edges overlaying the base portions of said type elements in the region of the straight portions of said monorail,
(l) said retainer plate being substantially horizontally coplanar with said vertical drive arms of said type elements,
(m) a pair of flat gear wheels on opposite ends of said retainer plate within the curved portions of said guide path,
(n) said gear wheels being coplanar with said retainer plate and overlaying the base portions of said type elements along the curved portions of said monorail,
(o) a cover plate superimposed on said retainer plate,
(p) journal means for rotatably supporting said gear wheels on said cover plate and in driving connection with said gear means on said vertical arms of said type elements,
(q) and means forming a drive connection for said gear wheels to an external drive member.

6. In a printer apparatus in accordance with claim 1 in which (a) said continuous monorail has a horizontal and adjoining outer vertical guide surface, (b) said type elements of said type train have a base portion longitudinally slidable along said horizontal guide surface and guide means on said base portion slidably gripping said vertical guide surface of said monorail, (c) and said groove means in said monorail forms a wiping edge in the horizontal and vertical guide surfaces of said monorail.

7. In a printer in accordance with claim 1 in which (a) said wiping edge on said horizontal guide surface is transverse to said line of travel of said type elements and (b) said wiping edge in said vertical guide surface is oblique to the direction to travel of said type elements.

8. A type mechanism for a high speed printer comprising in combination, (a) type support means, (b) a continuous monorail on said support means forming a continuous guide for cycling type elements on said support means, (c) a plurality of type elements on said monorail, (d) said type elements having a base portion slidable on said monorail, (e) type indicia carried by said base portion in position for producing an imprint on a print medium, (f) guide members extending from said base portion in slidable engagement with said monorail, (g) power take-off means extending from said base portion, (h) and means for sliding said type elements along said monorail as a train of type including drive means carried by said support member and engageable with said power take-off means of said base portion.

9. In a printer apparatus in which hammer means strikes a print medium against moving type, a type mechanism for cyclically presenting said type to said hammer means comprising in combination, (a) a carrier providing a guideway for said plurality of type elements including, (b) a horizontal support plate, (c) a raised monorail on one surface of said support plate, (d) said monorail having parallel straight portions with interconnecting curved portions forming a continuous guide path along said support plate, (e) a plurality of type elements, (f) said type elements forming a continuous type train along said monorail, (g) said type elements being in abutment along the straight portions of said monorail and individually separated along the curved portions thereof, (h) said type elements having a base portion slidable on said monorail, (i) extensions on said base portion for engaging lateral surfaces of said monorail during longitudinal movement therealong, (j) type indicia formed on an external surface of one of said extensions of said base portion, (k) said type indicia being in line with said monorail whereby said monorail serves as a backup member for said type indicia when subjected to impact of a hammer means, (l) a drive arm extending from said base portion, (m) gear means formed on said drive arm, (n) and means for moving said type elements in abutment longitudinally along said monorail including gear means mounted on said support plate drivingly engageable with the gear means formed on the drive arm of said type elements.

10. In a high speed printer apparatus, a type mechanism for cyclically presenting type for printing comprising in combination, (a) type support means, (b) a continuous monorail on said support means forming a longitudinal guide path, (c) a type train carried by said support means comprising a plurality of individual type elements slidable on said monorail and in abutment with each other during longitudinal motion therealong, (d) means for moving said type elements along said monorail whereby said type elements are presented to a location where said type elements are used for printing, (e) and means for removing foreign particles collecting on said type elements from interacting surfaces of said monorail and said type elements comprising (f) groove means in said monorail having wiping edges for contacting surfaces of said type elements slidable on said monorail.

References Cited by the Examiner

UNITED STATES PATENTS

| | | | |
|---|---|---|---|
| 1,710,551 | 4/1929 | Rawson | 101—425 X |
| 2,511,921 | 6/1950 | Keuper | 101—425 |
| 2,918,865 | 12/1959 | Wooding | 101—93 |
| 2,936,704 | 5/1960 | Hense | 101—93 |
| 3,012,499 | 12/1961 | Amada | 101—93 |
| 3,041,964 | 7/1962 | Simpson et al. | 101—111 |

WILLIAM B. PENN, *Primary Examiner.*